(12) United States Patent
Hasegawa et al.

(10) Patent No.: US 7,894,317 B2
(45) Date of Patent: Feb. 22, 2011

(54) OPTICAL RECORDING MEDIUM RECORDING AND REPRODUCING APPARATUS AND TRACKING CONTROL METHOD

(75) Inventors: Hiroshi Hasegawa, Kanagawa (JP); Hiromichi Kobori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 540 days.

(21) Appl. No.: 12/034,818

(22) Filed: Feb. 21, 2008

(65) Prior Publication Data
US 2008/0239903 A1   Oct. 2, 2008

(30) Foreign Application Priority Data
Mar. 28, 2007   (JP)   ............... 2007-085977

(51) Int. Cl.
*G11B 7/00*   (2006.01)
(52) U.S. Cl. ............... 369/53.28; 369/53.27; 369/94
(58) Field of Classification Search ............... 369/53.27, 369/53.28
See application file for complete search history.

(56) References Cited

U.S. PATENT DOCUMENTS

| | | | | |
|---|---|---|---|---|
| 7,158,471 | B2 * | 1/2007 | Hofmann et al. | 369/124.11 |
| 7,391,682 | B2 * | 6/2008 | Ishiyama et al. | 369/44.29 |
| 7,596,061 | B2 * | 9/2009 | Kudo et al. | 369/44.23 |
| 7,706,235 | B2 * | 4/2010 | Yim | 369/112.03 |
| 2004/0085874 | A1 | 5/2004 | Akiyama et al. | |
| 2005/0161579 | A1 * | 7/2005 | Kim et al. | 250/201.5 |
| 2005/0199778 | A1 | 9/2005 | Kadowaki et al. | |
| 2007/0195663 | A1 | 8/2007 | Kadowaki et al. | |
| 2007/0195664 | A1 | 8/2007 | Kadowaki et al. | |
| 2008/0068944 | A1 | 3/2008 | Kadowaki et al. | |
| 2008/0084798 | A1 | 4/2008 | Kadowaki et al. | |
| 2008/0089195 | A1 | 4/2008 | Kadowaki et al. | |
| 2008/0259750 | A1 | 10/2008 | Kadowaki et al. | |

FOREIGN PATENT DOCUMENTS

| | | |
|---|---|---|
| CN | 1485828 | 3/2004 |
| CN | 1499491 | 5/2004 |
| JP | 2004-039022 | 2/2004 |
| JP | 2005-293807 | 10/2005 |
| JP | 2005-346882 | 12/2005 |
| JP | 2005-353252 | 12/2005 |
| JP | 2006-202377 | 8/2006 |

OTHER PUBLICATIONS

Japanese Office Action corresponding to U.S. Appl. No. 12/034,818 mailed on Jun. 23, 2009.
Chinese Office Action for 2008100870292 mailed on Jan. 22, 2010.

* cited by examiner

*Primary Examiner*—Wayne R Young
*Assistant Examiner*—Adam R Giesy
(74) *Attorney, Agent, or Firm*—Turocy & Watson, LLP

(57) ABSTRACT

A tracking control is performed based on a first tracking error signal obtained from a first light beam reflected on an optical recording medium and a second tracking error signal obtained from a second light beam reflected on the optical recording medium. The first tracking error signal is corrected when recording information to or reproducing information from a first information recording layer that includes a first area facing an area on a second information recording layer with no information recorded and a second area facing an area on the second information recording layer with information recorded.

10 Claims, 9 Drawing Sheets

OPTICAL RECORDING MEDIUM RECORDING AND REPRODUCING APPARATUS AND TRACKING CONTROL METHOD

CROSS-REFERENCE TO RELATED APPLICATIONS

This application is based upon and claims the benefit of priority from the prior Japanese Patent Application No. 2007-85977, filed on Mar. 28, 2007; the entire contents of which are incorporated herein by reference.

BACKGROUND OF THE INVENTION

1. Field of the Invention

The present invention relates to an optical recording medium recording and reproducing apparatus that records information to an optical recording medium having a first information recording layer and a second information recording layer and reproduces information from the optical recording medium and a tracking control method for performing a tracking control on the optical recording medium.

2. Description of the Related Art

In an optical recording medium recording and reproducing apparatus that records information to an optical disk and reproduces information from the optical disk, a laser beam is converged on a recording plane of the optical disk through a transparent substrate so that the information can be recorded to or reproduced from a target track by a small beam spot of the laser beam with a high density. To have the beam spot follow the target track accurately, a process of tracking servo is performed in which a tracking error is detected based on a reflected beam from the optical disk, and the objective lens is driven based on the detected tracking error signal so that the position of the beam spot is corrected in real-time.

A recordable optical disk such as a Digital Versatile Disk-Recordable (DVD-R) and a Digital Versatile Disk-Rewritable (DVD-RW) has guiding grooves on the disk. These grooves are used as tracks. Examples of tracking error detection methods include a differential push-pull method that uses a plurality of beams, normally, three beams. Even if only one beam is used, it is possible to detect tracking errors based on a push-pull signal indicating an intensity difference between an inner circumference side of the track and an outer circumference side of the track, by causing a reflected beam from the optical disk to converge on a light detecting unit.

However, if the objective lens shifts away from the center of a beam path due to an eccentricity of the optical disk or the like during the tracking process, an offset will be caused in a subtraction calculation of the push-pull signal. To cope with this problem, a tracking servo technique that uses the differential push-pull method is known by which the push-pull signal is detected by using a plurality of beams at the same time, and a calculation is performed so as to cancel the offset.

In recent years, attention is paid to increases in the capacity of single-sided multi-layer optical disks each of which has a plurality of information recording layers to and from which information can be recorded and reproduced. In an optical recording medium recording and reproducing apparatus used for such single-sided multi-layer optical disks, an optical beam is converged on each information recording layer used for the recording or the reproducing, and a reflected beam from the information recording layer is received, so that it is possible to record or reproduce information from one side of each information recording layer. The tracking servo technique used in this situation is the same as the one used for normal optical disks.

A difference in a single-sided multi-layer optical disk is that all the reflection films except for the reflection film provided on the information recording layer that is positioned farthest from the laser-beam incident side are arranged to be translucent, so that it is possible to record or reproduce information to or from each of the information recording layers from the one side of the disk. Thus, an inter-layer crosstalk is caused in which a reflected beam that has been reflected on an information recording layer (hereinafter, a "non-recording/reproducing information recording layer") that is different from the information recording layer onto or from which information is to be recorded or reproduced (hereinafter, "recording/reproducing information recording layer") is irradiated onto a light receiving element in the light detecting unit, in a largely defocused manner.

In other words, the light receiving element in the light detecting unit not only receives a reflected beam from the recording/reproducing information recording layer but also receives the reflected beam from the other non-recording/reproducing information recording layer in a spread and multiplexed manner.

Among the beams used by an optical system included in a commonly-used optical recording medium recording and reproducing apparatus, the ratio of intensity between a main-beam that is used for recording and reproducing information and sub-beams that are used for performing the tracking servo process with the differential push-pull method is approximately 10:1. Thus, in the light receiving areas for the sub-beams, the intensity of the reflected beam of the main-beam on a non-recording/reproducing information recording layer is too high to be negligible, compared to the intensity of the reflected beam of a sub-beam reflected on a recording/reproducing information recording layer, which is supposed to be a target of the detection process. This situation has a negative influence on the signal detection process.

To solve this problem, JP-A 2005-293807 (KOKAI) discloses a conventional technique that reduces the influence of multiplexed reflected beams from non-recording/reproducing information recording layers by making the light receiving areas for the sub-beams smaller in a light detecting unit.

Furthermore, JP-A 2005-353252 (KOKAI) discloses another conventional technique by which a light receiving area that is exclusively for a reflected beam from a non-recording/reproducing information recording layer is additionally provided in each of two positions on the outside of a normal light receiving area that receives a reflected beam from a recording/reproducing information recording layer, so that a sub-beam detection signal is corrected by using a signal in the detected reflected beam from the non-recording/reproducing information recording layer.

However, when the technique disclosed in JP-A 2005-293807 (KOKAI) is used, there is a limit to the extent to which the light receiving area in the light detecting unit can be smaller. Thus, when the light receiving area is not small enough, it is not possible to sufficiently mitigate the influence of the reflected beam from the non-recording/reproducing information recording layer.

Furthermore, when the technique disclosed in JP-A 2005-353252 (KOKAI) is used, the light receiving area that is exclusively for the reflected beam from the non-recording/reproducing information recording layer is additionally provided so that the sub-beam detection signal is corrected by using the signal in the detected reflected beam from the non-recording/reproducing information recording layer. Thus, it is necessary to provide a light receiving element that has a special light receiving pattern so as to provide the light receiving area that is exclusively for the reflected beam from the non-recording/reproducing information recording layer. In addition, it is also necessary to additionally provide a detecting circuit for the signal in the reflected beam from the non-recording/reproducing information recording layer as well as a signal processing circuit for the signal in the reflected beam. Consequently, a problem arises where the structure of the optical recording medium reproducing apparatus becomes complicated.

In particular, in a case where information is not recorded in the entire area of a non-recording/reproducing information recording layer, in other words, information is recorded only in a partial area of a non-recording/reproducing information recording layer, another problem as described below arises.

At the moment when a light beam that is converged on a recording/reproducing information recording layer moves from an area on the recording/reproducing information recording layer that faces an area on a non-recording/reproducing information recording layer in which no information has been recorded to an area on the recording/reproducing information recording layer that faces an area on the non-recording/reproducing information recording layer in which information has already been recorded, a difference is caused in the intensity of the reflected beam from the non-recording/reproducing information recording layer between the inner circumference side of the track and the outer circumference side of the track. The beam is multiplexed onto the sub-beam light receiving area while having the intensity difference. The intensity difference causes an error in the detection process of the push-pull signal in the sub-beams, and also, an error will be caused in a tracking error signal used in the differential push-pull method. As a result, when the tracking servo operation is performed based on mutually the same tracking error signal, a phenomenon called "de-tracking" occurs in which the beam is not able to trace the center of the track of the optical disk. This leads to a problem where it is not possible to record and reproduce the information accurately.

SUMMARY OF THE INVENTION

An apparatus according to one aspect of the present invention is for recording information to and reproducing information from an optical recording medium having a first information recording layer and a second information recording layer. The apparatus includes a light source that emits a light beam; a diffractive optical element that divides the light beam into a first light beam and a second light beam; a converging unit that converges the first light beam and the second light beam on the optical recording medium; a driving unit that drives the converging unit; a light detecting unit that detects a first reflected light beam that is the first light beam reflected on the optical recording medium and a second reflected light beam that is the second light beam reflected on the optical recording medium; a tracking control unit that performs a tracking control by driving the driving unit based on a first tracking error signal obtained from the first reflected light beam and a second tracking error signal obtained from the second reflected light beam; and a correcting unit that corrects the first tracking error signal when the information is recorded to or reproduced from the first information recording layer that includes a first area in opposite to an area on the second information recording layer on which no information is recorded and a second area in opposite to an area on the second information recording layer on which information is recorded. The tracking control unit performs the tracking control based on the first tracking error signal corrected by the correcting unit and the second tracking error signal. A method according to another aspect of the present invention is for controlling a tracking an optical recording medium having a first information recording layer and a second information recording layer. The method includes dividing a light beam emitted from a light source into at least a first light beam and a second light beam; converging the first light beam and the second light beam on the optical recording medium; detecting a first reflected light beam that is the first light beam reflected on the optical recording medium and a second reflected light beam that is the second light beam reflected on the optical recording medium; performing a tracking control based on a first tracking error signal obtained from the first reflected light beam and a second tracking error signal obtained from the second reflected light beam; and correcting the first tracking error signal when the information is recorded to or reproduced from the first information recording layer that includes a first area in opposite to an area on the second information recording layer on which no information is recorded and a second area in opposite to an area on the second information recording layer on which information is recorded. The performing includes performing the tracking control based on the first tracking error signal corrected at the correcting and the second tracking error signal.

DETAILED DESCRIPTION OF THE INVENTION

Exemplary embodiments of the present invention are explained in detail below with reference to the accompanying drawings.

Figure 1:
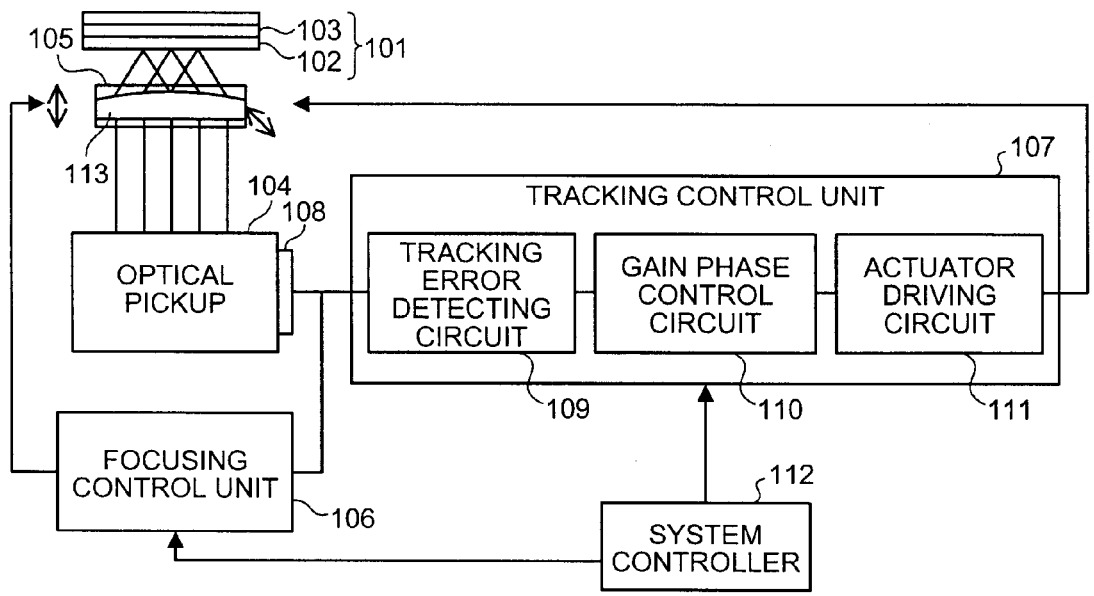
FIG. 1 is a block diagram of an optical disk apparatus according to a first embodiment of the present invention.

As shown in FIG. 1, an optical disk apparatus according to a first embodiment of the present invention records and reproduces back information to and from a single-sided two-layer optical disk 101. The optical disk 101 has a structure in which two information recording layers (i.e., an L1 layer 103 and an L0 layer 102) are laminated on a substrate. A reflection film provided on the L0 layer 102, which is positioned closer to the beam incident side, is arranged to be translucent so that it is possible to record or reproduce information to or from the two information recording layers (i.e., the L1 layer 103 and the L0 layer 102) from the one side of the disk.

As shown in FIG. 1, the optical disk apparatus according to the first embodiment primarily includes: an objective lens 113 that causes a beam to converge on the information recording layers (i.e., the L0 layer and the L1 layer) of the optical disk 101, an optical pickup 104, a photodetector 108, a focusing control unit 106, a tracking control unit 107, a system controller 112, and an actuator 105 that moves the objective lens 113 based on driving signals from the focusing control unit 106 and the tracking control unit 107.

Figure 2:
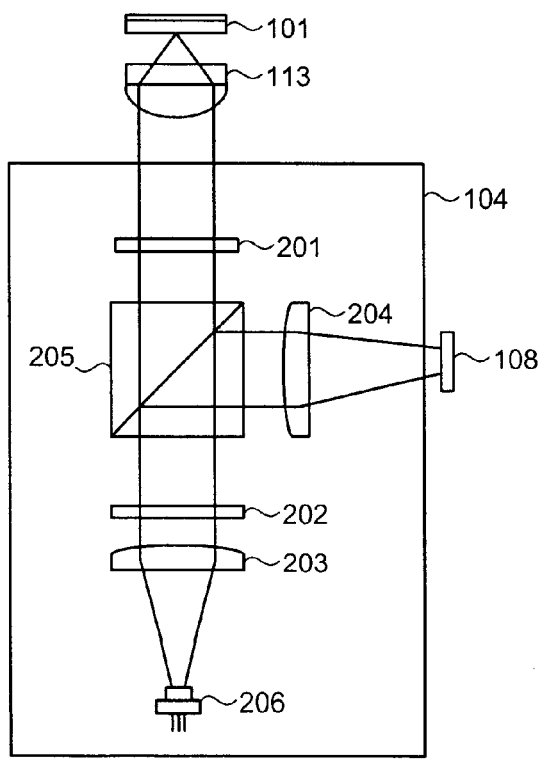
FIG. 2 is a schematic drawing of an optical pickup.

As shown in FIG. 2, a beam that is emitted from a semiconductor laser 206 is changed into a parallel light flux by a collimator lens 203. The parallel light flux is then (divided by a diffractive optical element 202 into a 0-order beam and ±1st-order beams, the 0-order beam being a main-beam for recording or reproducing information to or from the optical disk 101, and the ±1st-order beams being sub-beams for performing a tracking servo process. These beams become incident to a polarized beam splitter 205 as linearly-polarized light and pass through the polarized beam splitter 205 by approximately 100%. The beams then pass through a quarter-wavelength plate 201 so as to be converted into circularly-polarized light and then converged on the optical disk 101 by the objective lens 113. The 0-order beam is shown in FIG. 2.

Reflected beams of the main-beam and the sub-beams reflected on the optical disk 101 pass through the quarter-wavelength plate 201 so as to be converted into linearly-polarized light, before becoming incident to the polarized beam splitter 205 and being reflected by approximately 100%. After that, the reflected beams pass through a condenser lens 204 and are then received by the photodetector 108.

The photodetector 108 receives the reflected beam of the main-beam and the reflected beams of the two sub-beams and converts the light intensities of the received beams into electric signals. The photodetector 108 has a light receiving area for the main-beam and two light receiving areas for the sub-beams. Because each of the light receiving areas is further divided into cells, it is possible to obtain a push-pull signal for each of the beams by performing calculations between the cells (not shown).

Returning to the description of FIG. 1, the system controller 112 sends various types of instructions to the focusing control unit 106 and the tracking control unit 107.

The focusing control unit 106 performs a focusing servo process by driving the actuator 105, based on a signal that has been output from a light receiving unit of the photodetector 108.

The tracking control unit 107 performs the tracking servo process by driving the actuator 105, based on a signal that has been output from the light receiving unit of the photodetector 108.

According to the first embodiment, the tracking servo process is performed by using the differential push-pull (DPP) method in which the three beams (i.e., the main-beam and the two sub-beams) are used.

As shown in FIG. 1, the tracking control unit 107 includes a tracking error detecting circuit 109, a gain phase control circuit 110, and an actuator driving circuit 111.

The tracking error detecting circuit 109 is a circuit that calculates a tracking error signal each from the main-beam and the sub-beams that have been received by the light receiving elements in the photodetector 108. According to the first embodiment, a recording medium that has a Land/groove structure such as a DVD-R (recordable) or a DVD-RW (rewritable) is used as a target, and also the differential push-pull method is used as a method for detecting tracking errors. Thus, the tracking error detecting circuit 109 calculates, as the tracking error signals, a push-pull signal for the main-beam and a push-pull signal for the sub-beams. The tracking error detecting circuit 109 further calculates and outputs a differential push-pull signal that denotes a difference between the two push-pull signals. The details of the tracking error detecting circuit 109 will be explained later.

The gain phase control circuit 110 is an arithmetic circuit that adjusts a gain and a phase so as to structure a tracking servo system that feeds back the tracking error signals to the driving of the actuator.

The actuator driving circuit 111 is a circuit that sends a tracking driving signal to the actuator, based on the tracking error signals of which the gain and the phase have been adjusted.

Figure 3:
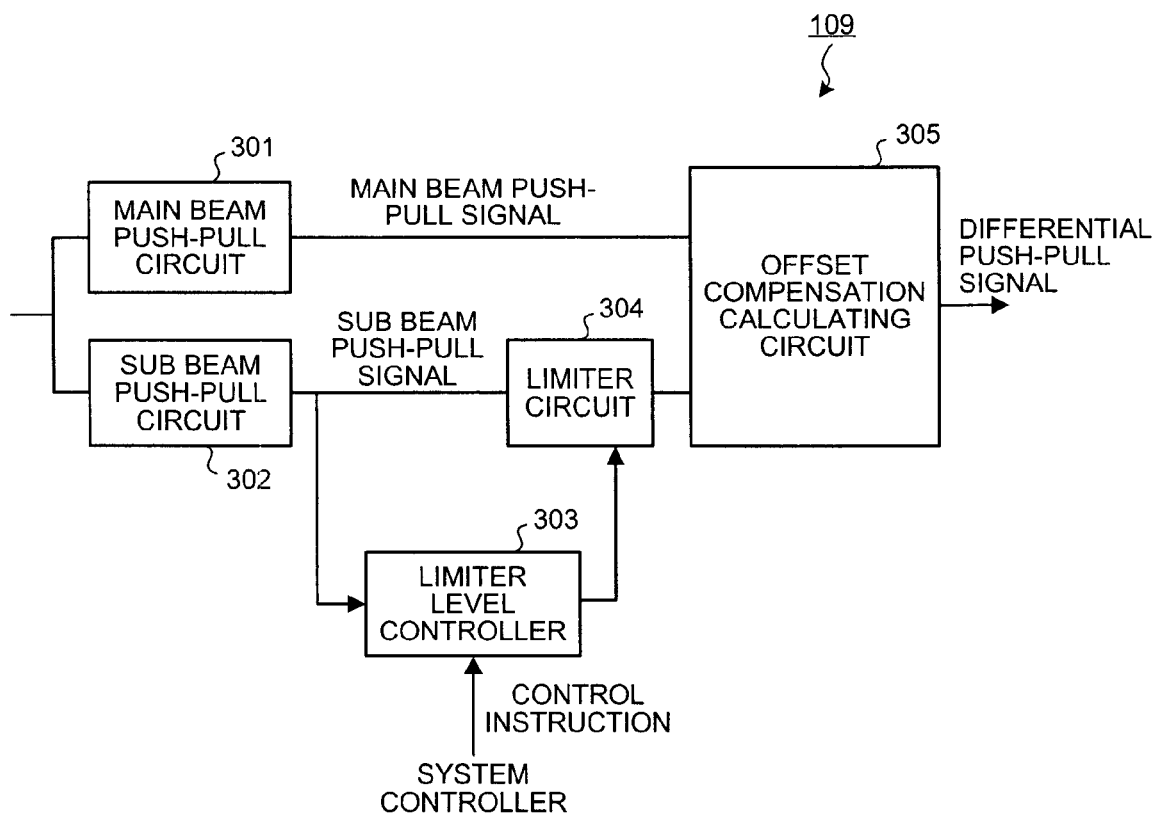
FIG. 3 is a block diagram of functional configurations of a tracking error detecting circuit.

Next, the details of the tracking error detecting circuit 109 will be explained. As shown in FIG. 3, the tracking error detecting circuit 109 includes: a main-beam push-pull circuit 301, a sub-beam push-pull circuit 302, a limiter circuit 304, a limiter level controller 303, and an offset compensation calculating circuit 305.

The main-beam push-pull circuit 301 is a circuit that calculates the main-beam push-pull signal based on the electric signal of the main-beam received by the photodetector 108. The sub-beam push-pull circuit 302 is a circuit that calculates the sub-beam push-pull signal based the electric signals of the two sub-beams received by the photodetector 108. More specifically, the sub-beam push-pull circuit 302 performs a subtraction on the electric signals of the sub-beam reflected beams received by the photodetector 108 between the divided cells and outputs the sub-beam push-pull signal.

The offset compensation calculating circuit 305 is a circuit that is configured with a subtractor or the like and that receives an input of the main-beam push-pull signal and the sub-beam push-pull signal and calculates the differential push-pull signal that denotes the difference between the input push-pull signals and functions so as to cancel an offset.

The limiter circuit 304 is a circuit that is configured with a diode or the like and that, in a case where the sub-beam push-pull signal exceeds a predetermined first threshold value that is a limiter level, outputs the sub-beam push-pull signal after limiting it to the first threshold value. The limiter circuit 304 corrects and limits the sub-beam push-pull signal so as to have a value that is equal to or smaller than the predetermined first threshold value. The limiter Level controller 303 adjusts the limiter level.

The reason why, according to the first embodiment, the limiter circuit 304 that limits the sub-beam push-pull signal so as to have the value that is equal to or smaller than the first threshold value (i.e., the limiter level) is provided can be explained as below:

A detection error is caused in the sub-beam push-pull signal when a beam spot converged on a recording/reproducing information recording layer of the optical disk 101 passes through a boundary (hereinafter, a "recording boundary") between (a) an area on the recording/reproducing information recording layer that faces an area on a non-recording/reproducing information recording layer in which no information has been recorded and (b) an area on the recording/reproducing information recording layer that faces an area on the non-recording/reproducing information recording layer in which information has already been recorded.

Figure 4:
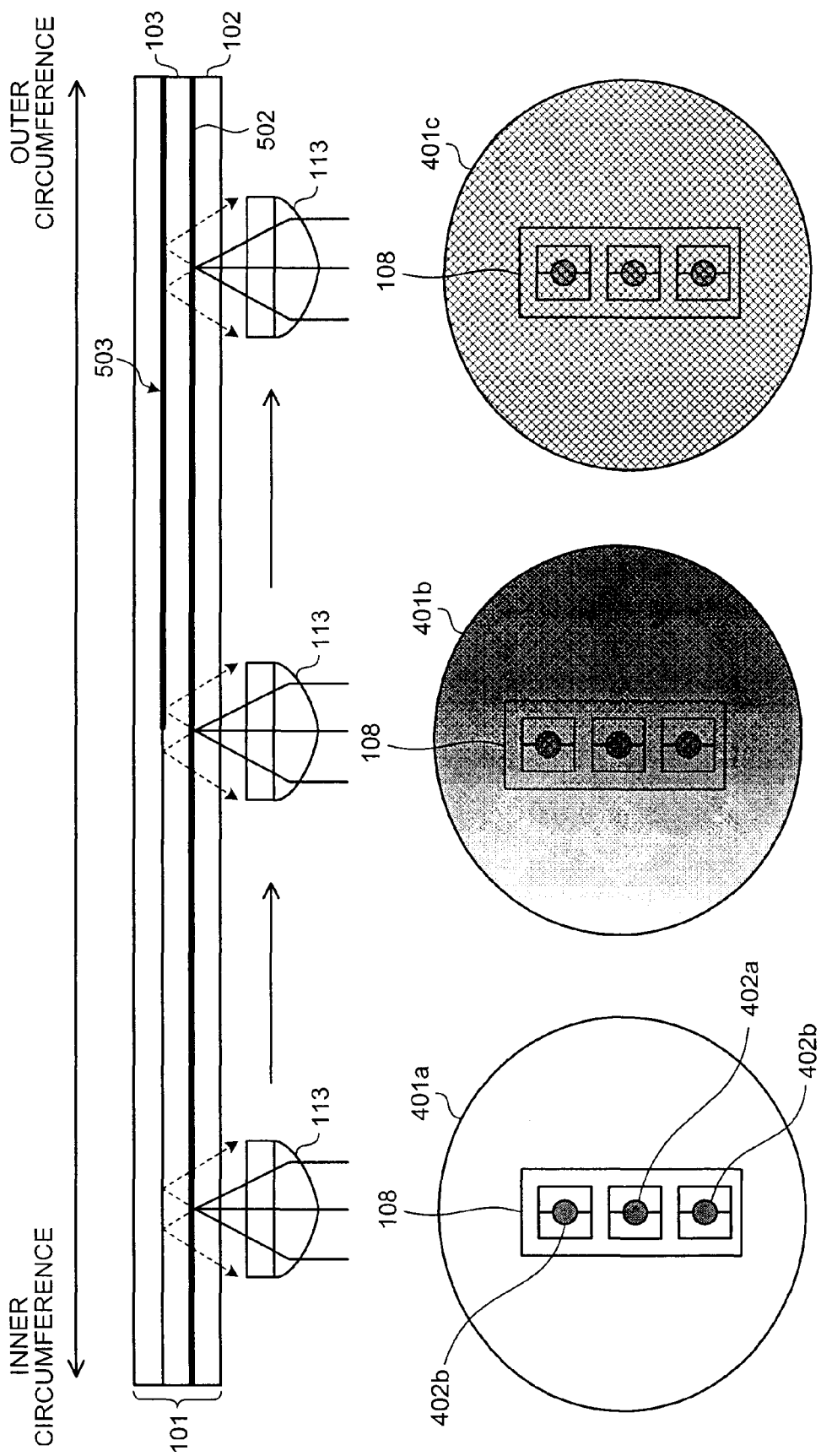
FIG. 4 is a drawing for explaining a state in which reflected beams are received by a light detecting unit when the reflected beams pass through a recording boundary.

Shown in FIG. 4 is a state in which the reflected beams are received by the photodetector 108 when the reflected beams pass through the recording boundary. In the example shown in FIG. 4, the recording/reproducing information recording layer is indicated as the L0 layer 102 and the beams are converged on the L0 layer 102. Also, as shown in FIG. 4, information 502 is recorded in the entire area of the L0 layer from the inner circumference side to the outer circumference side. However, on the L1 layer 103 that is the non-recording/reproducing information recording layer, information 503 is recorded only in a partial area on the outer circumference side.

Let us assume that, in the state described above, information is to be recorded onto the L0 layer 102 or reproduced from the L0 layer 102 by moving the objective lens 113 from the inner circumference side to the outer circumference side of the optical disk 101. In this situation, the reflected beams from the L0 layer 102 are converged on the photodetector 108 as a beam spot. As shown in FIG. 4, a beam spot 402a of a reflected beam of the main-beam as well as beam spots 402b of reflected beams of the two sub-beams are converged on the corresponding light receiving elements, respectively, in the photodetector 108. On the other hand, the reflected beams from the L1 layer 103 are received while spreading so as to cover the photodetector 108.

In the following section, an example will be explained in which a reflectance of the L1 layer 103 is low before information is recorded thereon and is high after information has been recorded thereon. As shown in FIG. 4 on the inner circumference side, in a case where information is recorded onto or reproduced from an area on the L0 layer 102 that faces an area on the L1 layer 103 in which no information has been recorded, the intensity of a reflected beam 401a that has passed through the L0 layer 102 and has been reflected on the L1 layer 103 is small. However, on the other hand, as shown in FIG. 4 on the outer circumference side, in a case where information is recorded onto or reproduced from an area on the L0 layer 102 that faces an area on the L1 layer 103 in which information has already been recorded, the intensity of a reflected beam 401c that has passed through the L0 layer 102 and has been reflected on the L1 layer 103 is large, as shown in FIG. 4.

Thus, when the beam passes through the area (i.e., the recording boundary) on the L0 layer 102 that faces the boundary between the area on the L1 layer 103 in which no information has been recorded and the area on the L1 layer 103 in which information has been recorded, an intensity difference is caused in a reflected beam 401b that has been reflected on the L1 layer 103, between the inner circumference side of the track and the outer circumference side of the track. The beam is multiplexed onto the light receiving element for the sub-beams while having the intensity difference. As a result, a detection error is caused in the sub-beam push-pull signal.

In this situation, when a differential push-pull signal is calculated by using the sub-beam push-pull signal described above, an error will be caused also in the differential push-pull signal. Consequently, it is not possible to accurately perform the tracking servo process.

Figure 5:
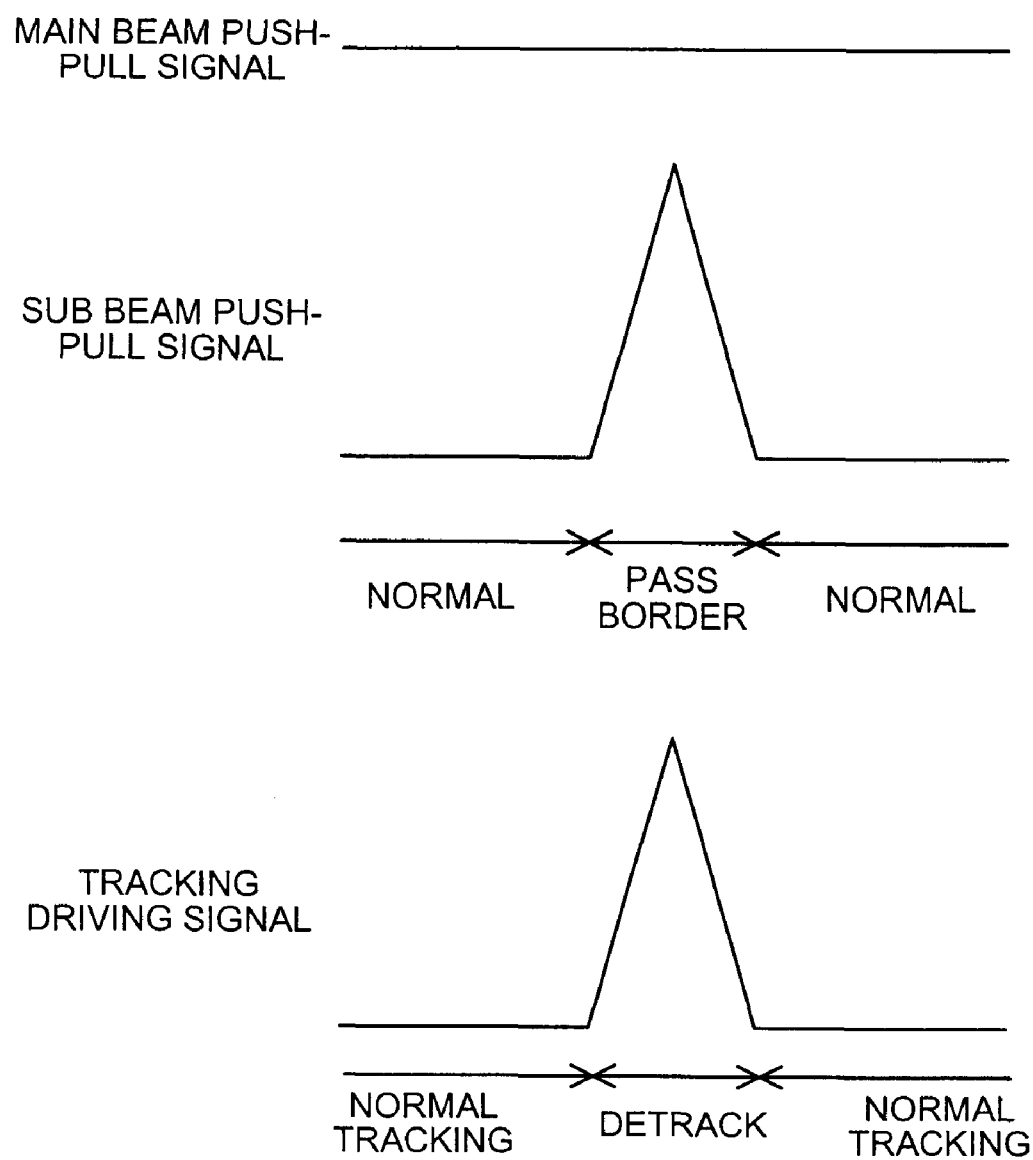
FIG. 5 is a drawing for explaining a state of a main push-pull signal and a sub push-pull signal.

In FIG. 5, a state of the main-beam push-pull signal and the sub-beam push-pull signal is shown. As shown in FIG. 5, the sub-beam push-pull signal changes a lot when the beams pass through the recording boundary, although the main-beam push-pull signal does not change. As a result, a large error will be caused in a tracking driving signal that is obtained by performing a calculation on the differential push-pull signal by using the sub-beam push-pull signal.

To cope with this situation, according to the first embodiment, even in a case where the sub-beam push-pull signal becomes too large when the beams pass through the recording boundary on the L0 layer 102, the limiter circuit 304 outputs the sub-beam push pull signal after limiting it to the first threshold value (i.e., the limiter level). Consequently, errors are inhibited from occurring in the sub-beam push-pull signal when the beams pass through the recording boundary.

Figure 6:
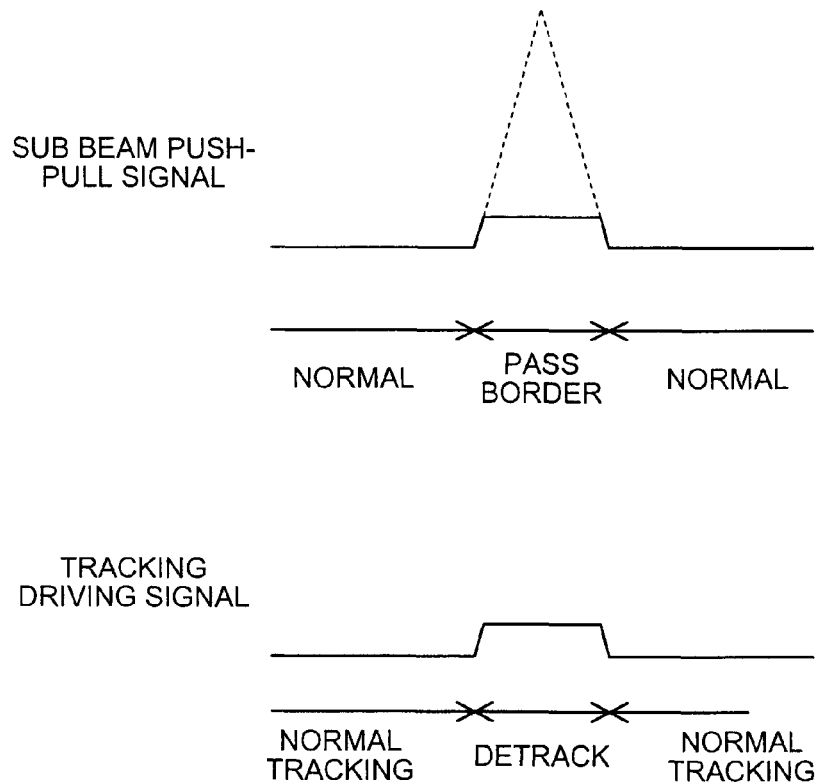
FIG. 6 is a drawing for explaining a state of a sub-beam push-pull signal according to the first embodiment.

In FIG. 6, a state of the sub-beam push-pull signal according to the first embodiment is shown. As shown in FIG. 6, according to the first embodiment, even if the sub-beam push-pull signal is about to exceed the limiter level (i.e., the first threshold value), the limiter circuit 304 controls the output value to the limiter level. Thus, even when the beams pass through the recording boundary, the sub-beam push-pull signal is limited to the limiter level (i.e., the first threshold value). As a result, the detection errors in the sub-beam push-pull signal are controlled so as to be small. Consequently, errors in the tracking driving signal are also inhibited, and it is therefore possible to accurately perform the tracking servo process.

Incidentally, according to the first embodiment, the sub-beam push-pull signal is limited, which is different from a case in which the tracking error signal is limited because of dust or damages in general on the disk. Thus, even in a time period during which the sub-beam push-pull signal is limited, it is possible to continue the information recording/reproducing process while the tracking servo process is performed with the main-beam push-pull signal. In the time period during which the sub-beam push-pull signal is limited, it is not possible to cancel an offset component caused by a lens shift, which is an advantageous feature of the differential push-pull signal. However, generally speaking, because the time it takes for the beams to pass through the recording boundary is short, it is assumed that the influence of the offset caused by the lens shift during this time period on the tracking servo process is small.

On the other hand, in a case where an eccentricity of the track on the optical disk 101 is small, it takes longer for the beams to pass through the recording boundary. However, because the offset itself caused by the lens shift becomes smaller, the influence of the offset is, again, small.

When the limiter level (i.e., the first threshold value) used by the limiter circuit 304 is too high, the advantageous effect of the present invention to inhibit the errors in the tracking driving process becomes smaller. On the contrary, when the limiter level is too low, the limiter circuit 304 is more likely to have a malfunction. It is desirable to calculate, in advance, a limiter level for a maximum track error that is tolerable during the tracking servo process and to use the limiter level as the first threshold value.

Instead of using the first threshold value that is predetermined in this manner, it is also acceptable to use a variable limiter level that is adjusted by the limiter level controller 303 depending on the situation.

The value of the sub-beam push-pull signal changes depending on the state of the optical disk 101 and the state of the track. Thus, to have both the advantageous effect of inhibiting the de-tracking phenomenon and the advantageous effect of inhibiting detection errors more efficiently, another arrangement is acceptable in which a plurality of levels of threshold values are specified as the limiter levels in advance, so that the limiter circuit 304 uses one of the mutually different threshold values by judging whether information is to be recorded or is to be reproduced, based on an instruction from the system controller 112. Yet another arrangement is acceptable in which the limiter circuit 304 uses one of the mutually different threshold values for each of the layers by judging the type of the optical disk or judging whether information is to be recorded onto or reproduced from the L0 layer or the L1 layer, based on an instruction from the system controller 112. Yet another arrangement is acceptable in which the limiter circuit 304 uses one of the mutually different threshold values depending on the value of the sub-beam push-pull signal.

Further, yet another arrangement is acceptable in which the limiter level controller 303 determines an optimal threshold value used as the limit level, depending on the value of the sub-beam push-pull signal. In actuality, the Levels of signals used in the servo operation are digitally processed in optical disk apparatuses. Thus, it is possible to determine an optimal limit level by causing the system controller 112 to perform an internal arithmetic operation.

As additional information, the limiter circuit 304 does not have to operate all the time. An arrangement is acceptable in which the limiter circuit 304 operates in a restricted manner so as to prevent the detection errors only when information is to be recorded onto or reproduced from a single-sided two-layer optical disk and when it has been judged that some information has already been recorded in a partial area of one of the layers or when information is to be recorded onto or reproduced from an area near a recording boundary.

As explained above, when the optical disk apparatus according to the first embodiment is used, even in the case where the sub-beam push-pull signal has too high a value when the beams converged on the recording/reproducing information recording layer pass through the recording boundary that is the boundary between (a) an area on the recording/reproducing information recording layer that faces an area on a non-recording/reproducing information recording layer in which no information has been recorded and (b) an area on the recording/reproducing information recording layer that faces an area on the non-recording/reproducing information recording layer in which information has already been recorded, the limiter circuit 304 outputs the sub-beam push-pull signal after limiting it to the first threshold value that is the limiter level. Thus, it is possible to inhibit errors from occurring in the sub-beam push-pull signal when the beams pass through the recording boundary. It is therefore possible to accurately perform the tracking servo process and to accurately record or reproduce the information.

Furthermore, with regard to the optical disk apparatus according to the first embodiment, by only adding the limiter circuit 304 and the limiter level controller 303 to a conventional optical disk apparatus, it is possible to inhibit errors from occurring in the sub-beam push-pull signal when the beams pass through the recording boundary. Thus, without making the structure of the optical disk apparatus more complicated, it is possible to accurately perform the tracking servo process and to accurately record or reproduce the information.

In the optical disk apparatus according to the first embodiment, the sub-beam push-pull signal is limited by the limiter circuit so as to have a value that is equal to or smaller than the first threshold value. In an optical disk apparatus according to a second embodiment of the present invention, a time at which the beams pass through the recording boundary is detected so that, when such a time has been detected, a sample/hold circuit maintains the value of the sub-beam push-pull signal at a level that is observed immediately before the beams pass through the boundary.

Figure 7:
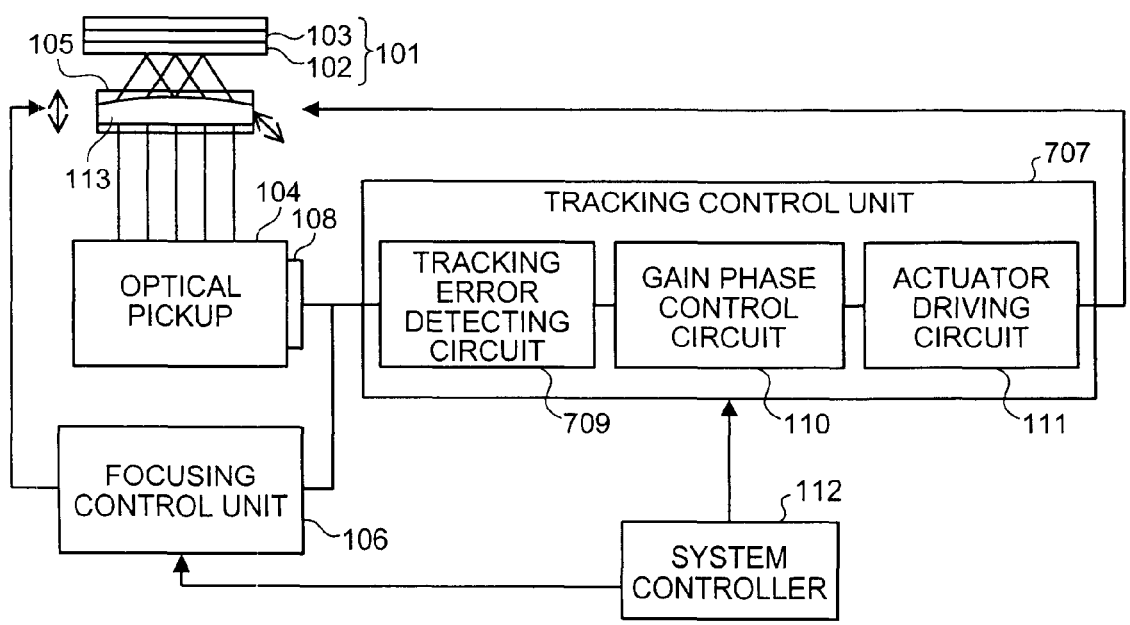
FIG. 7 is a block diagram of an optical disk apparatus according to a second embodiment of the present invention.

As shown in FIG. 7, the optical disk according to the second embodiment primarily includes: the objective lens 113 that causes a beam to converge on the information recording layers (i.e., the L0 layer and the L1 layer) of the optical disk 101, the optical pickup 104, the photodetector 108, the focusing control unit 106, a tracking control unit 707, the system controller 112, and the actuator 105 that moves the objective lens 113 based on driving signals from the focusing control unit 106 and the tracking control unit 707.

The objective lens 113, the optical pickup 104, the photodetector 108, the focusing control unit 106, the system controller 112, and the actuator 105 are the same as those explained in the description of the first embodiment.

As shown in FIG. 7, the tracking control unit 707 includes a tracking error detecting circuit 709, the gain phase control circuit 110, and the actuator driving circuit 111. The gain phase control circuit 110 and the actuator driving circuit 111 are the same as those explained in the description of the first embodiment.

Figure 8:
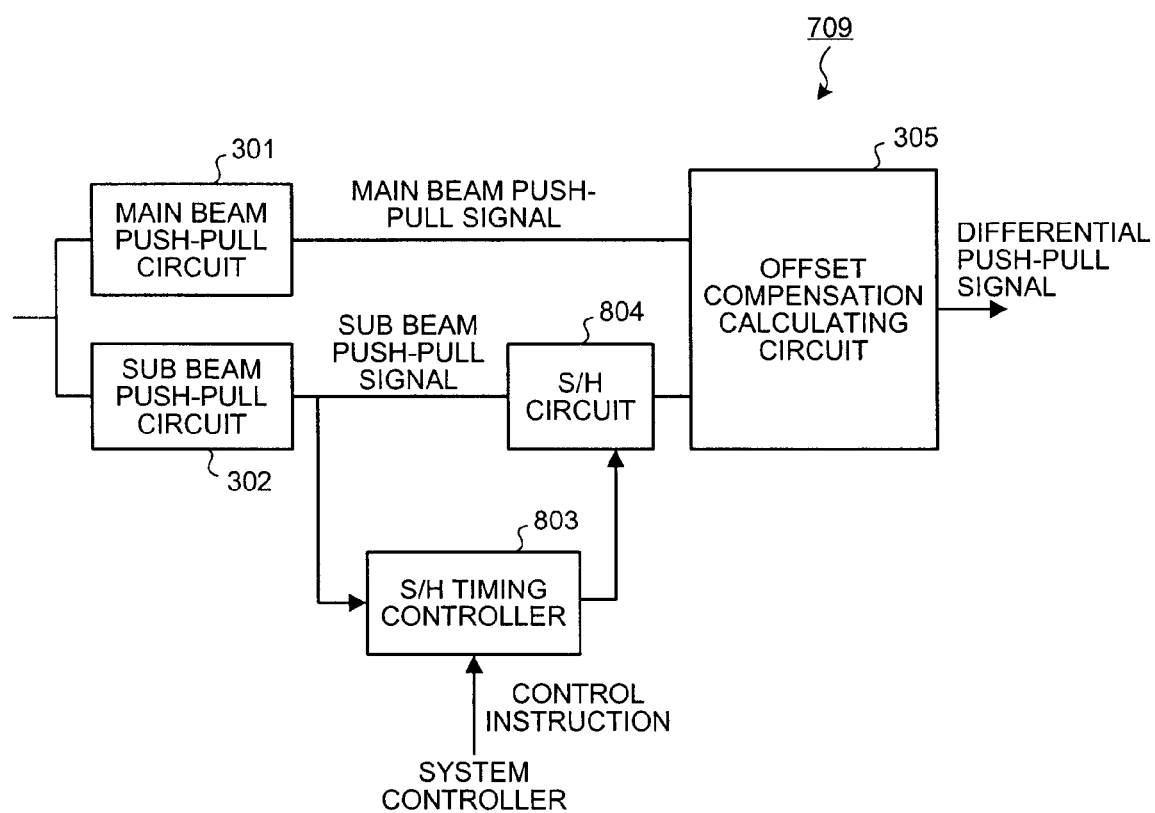
FIG. 8 is a block diagram of functional configurations of a tracking error detecting circuit according to the second embodiment.

As shown in FIG. 8, the tracking error detecting circuit 709 includes: the main-beam push-pull circuit 301, the sub-beam push-pull circuit 302, a sample/hold (S/H) circuit 804, an S/H timing controller 803, and the offset compensation calculating circuit 305. The main-beam push-pull circuit 301, the sub-beam push-pull circuit 302, and the offset compensation calculating circuit 305 are the same as those explained in the description of the first embodiment.

The S/H circuit 804 is a circuit that operates in one of a sample mode and a hold mode. When in the sample mode, the S/H circuit 804 receives an input of a sub-beam push-pull signal and outputs the input sub-beam push-pull signal as it is. When in the hold mode, the S/H circuit 804 maintains an output of the sub-beam push-pull signal at a level that is observed immediately before the S/H circuit 804 goes into the hold mode. The S/H circuit 804 is configured with, for example, a plurality of voltage followers.

The S/H timing controller 803 is a circuit that detects boundary passing timing that indicates a time at which beams pass through a recording boundary between (a) an area on a recording/reproducing information recording layer that faces an area on a non-recording/reproducing information recording layer in which no information has been recorded and (b) an area on the recording/reproducing information recording layer that faces an area on the non-recording/reproducing information recording layer in which information has already been recorded.

Figure 9:
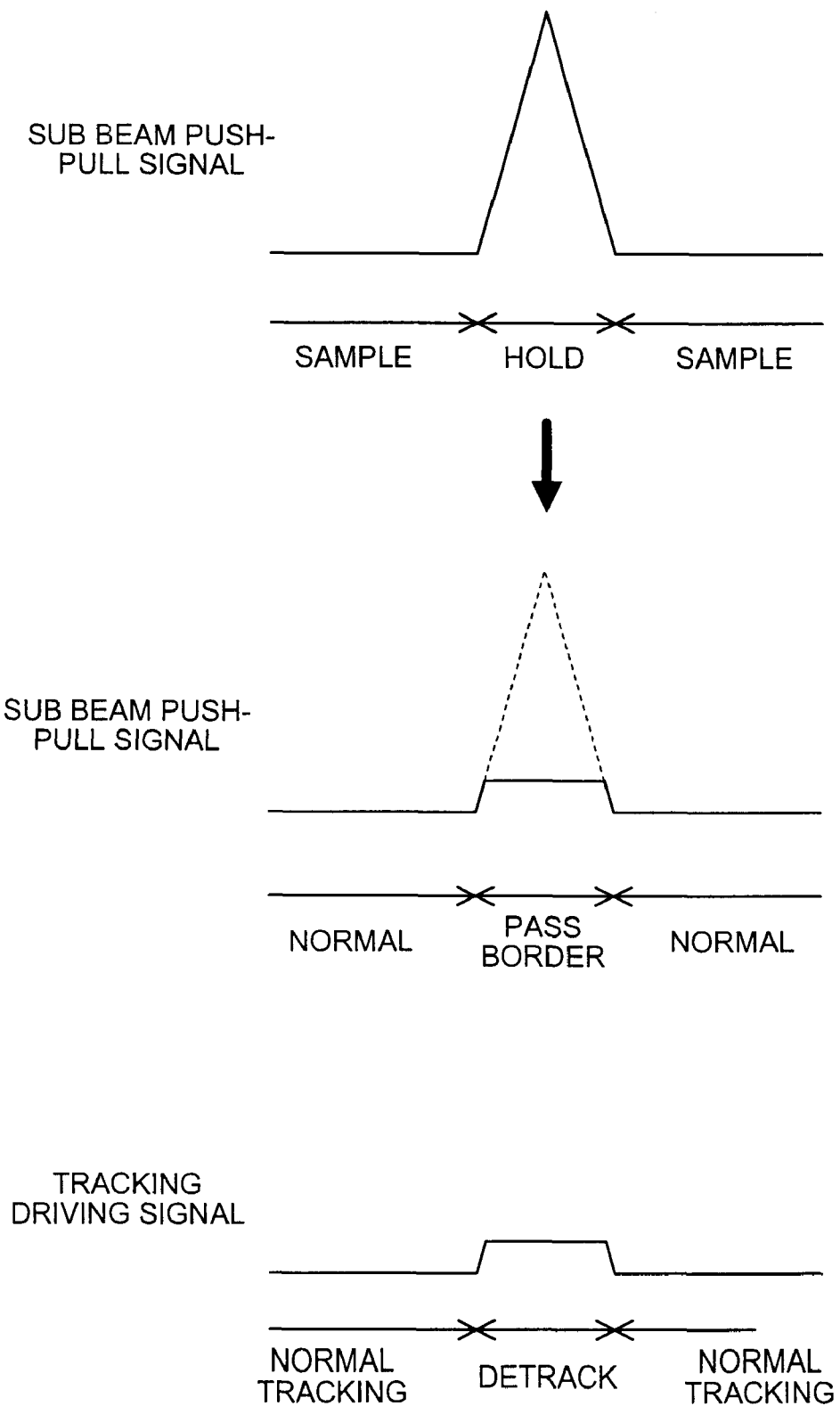
FIG. 9 is a drawing for explaining a state of a sub-beam push-pull signal according to the second embodiment.

In FIG. 3, a state of the sub-beam push-pull signal according to the second embodiment is shown. As shown in FIG. 9, according to the second embodiment, when the S/H timing controller 803 has detected boundary passing timing, the S/H circuit 804 is switched into the hold mode so that the sub-beam push-pull signal is maintained at a level that is observed immediately before the switching into the hold mode. Also, when the S/H timing controller 803 no longer detects the boundary passing timing, the S/H circuit 804 is switched into the sample mode so that the sub-beam push-pull signal is output as it is. With this arrangement, when the beams pass through the boundary, it is possible to keep the value of the sub-beam push-pull signal at a level that is observed immediately before the boundary passing. As a result, it is possible to keep the detection errors in the sub-beam push-pull signal small, too. Consequently, it is possible to inhibit errors from occurring in the tracking driving signal and to accurately perform the tracking servo process.

A first method used by the S/H timing controller 803 to detect the boundary passing timing is to detect a time period during which the level of the sub-beam push-pull signal is exceeding a second threshold value, which indicates that an error has occurred. In this method, the detection of the level and the holding (i.e., maintaining) of the level use mutually the same signal. Thus, the sub-beam push-pull signal is maintained at the second threshold value in the time period during which the sub-beam push-pull signal is exceeding the second threshold value. Consequently, the optical disk apparatus operates in a manner that is equivalent to the case where the sub-beam push-pull signal is limited by the limiter circuit 304 according to the first embodiment.

Accordingly, like in the first embodiment, an arrangement is acceptable in which a plurality of levels of threshold values are specified in advance, so that the S/H timing controller 803 uses one of the mutually different threshold values by judging whether information is to be recorded or is to be reproduced, based on an instruction from the system controller 112. Another arrangement is also acceptable in which the S/H timing controller 803 uses one of the mutually different threshold values for each of the layers by judging the type of the optical disk or judging whether information is to be recorded onto or reproduced from the L0 layer or the L1 layer, based on an instruction from the system controller 112. Yet another arrangement is acceptable in which the S/H timing controller 803 uses one of the mutually different threshold values depending on the value of the sub-beam push-pull signal.

Further, yet another arrangement is acceptable in which the S/H timing controller 803 determines an optimal second threshold value, depending on the value of the sub-beam push-pull signal.

A second method for detecting the boundary passing timing is to predict the boundary passing timing. For example, when information is to be recorded onto or reproduced from the L0 layer 102, a recording status of the L1 layer 103 indicated by address information of a recording ending position is stored, and also information related to how the tracks on the L0 layer 102 and the L1 layer 103 overlap each other is stored as address information, so that it is possible to predict whether there is boundary passing timing with respect to an address at which information is to be recorded onto or reproduced from the L0 layer 102. It is possible to use the system controller 112 to understand the recording status. Also, it is possible to obtain the address information indicating how the tracks on the L0 layer 102 and the L1 layer 103 overlap each other through a learning process, for example, by using information that is obtained in a recording/reproducing process performed in the previous rotation cycle of the disk.

As explained above, when the optical disk according to the second embodiment is used, the S/H timing controller 803 detects the boundary passing timing of the beams, and during the time period of the boundary passing timing, the S/H circuit 804 limits the value of the sub-beam push pull signal to a level that is observed immediately before the boundary passing. With this arrangement, it is possible to keep the detection errors in the sub-beam push-pull signal small. As a result, it is also possible to inhibit errors from occurring in the tracking driving signal. It is therefore possible to accurately perform the tracking servo process.

Also, with regard to the optical disk apparatus according to the second embodiment, by only adding the S/H circuit 804 and the S/H timing controller 803 to a conventional optical disk apparatus, it is possible to inhibit errors from occurring in the sub-beam push-pull signal when the beams pass through the recording boundary. Thus, without making the structure of the optical disk apparatus more complicated, it is possible to accurately perform the tracking servo process and to accurately record or reproduce the information.

In an optical disk apparatus according to a third embodiment of the present invention, the boundary passing timing is detected based on a change in a sum signal of the sub-beam reflected beams.

Figure 10:
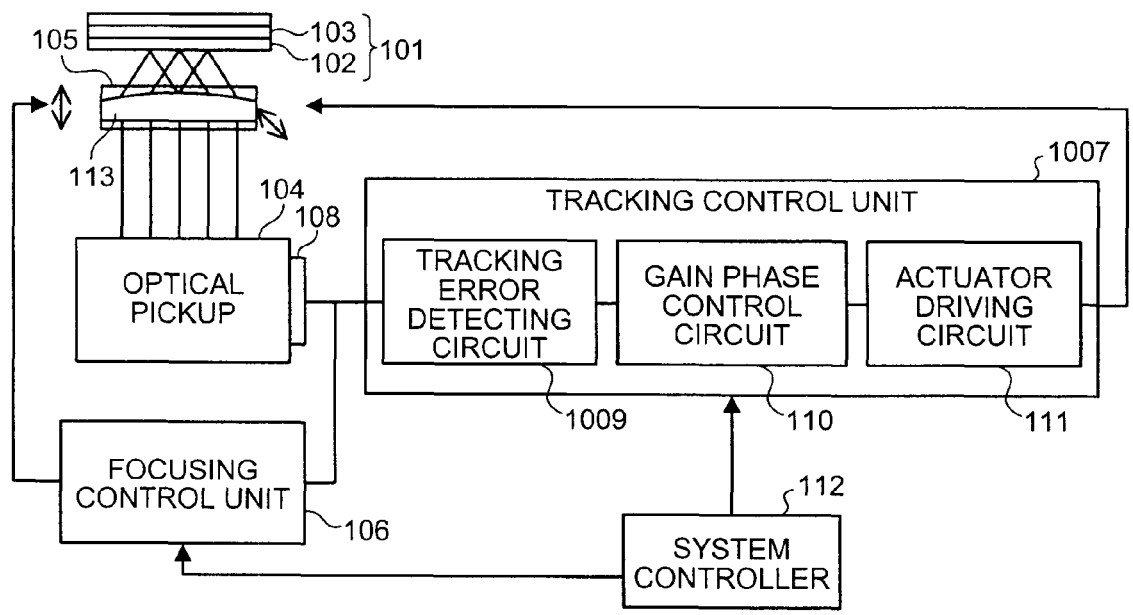
FIG. 10 is a block diagram of an optical disk according to a third embodiment of the present invention.

As shown in FIG. 10, the optical disk apparatus according to the third embodiment primarily includes: the objective lens 113 that causes a beam to converge on the information recording layers (i.e., the L0 layer and the L1 layer) of the optical disk 101, the optical pickup 104, the photodetector 108, the focusing control unit 106, a tracking control unit 1007, the system controller 112, and the actuator 105 that moves the objective lens 113 based on driving signals from the focusing control unit 106 and the tracking control unit 1007.

The objective lens 113, the optical pickup 104, the photodetector 108, the focusing control unit 106, the system controller 112, and the actuator 105 are the same as those explained in the description of the first embodiment.

As shown in FIG. 10, the tracking control unit 1007 includes a tracking error detecting circuit 1009, the gain phase control circuit 110, and the actuator driving circuit 111. The gain phase control circuit 110 and the actuator driving circuit 111 are the same as those explained in the description of the first embodiment.

Figure 11:
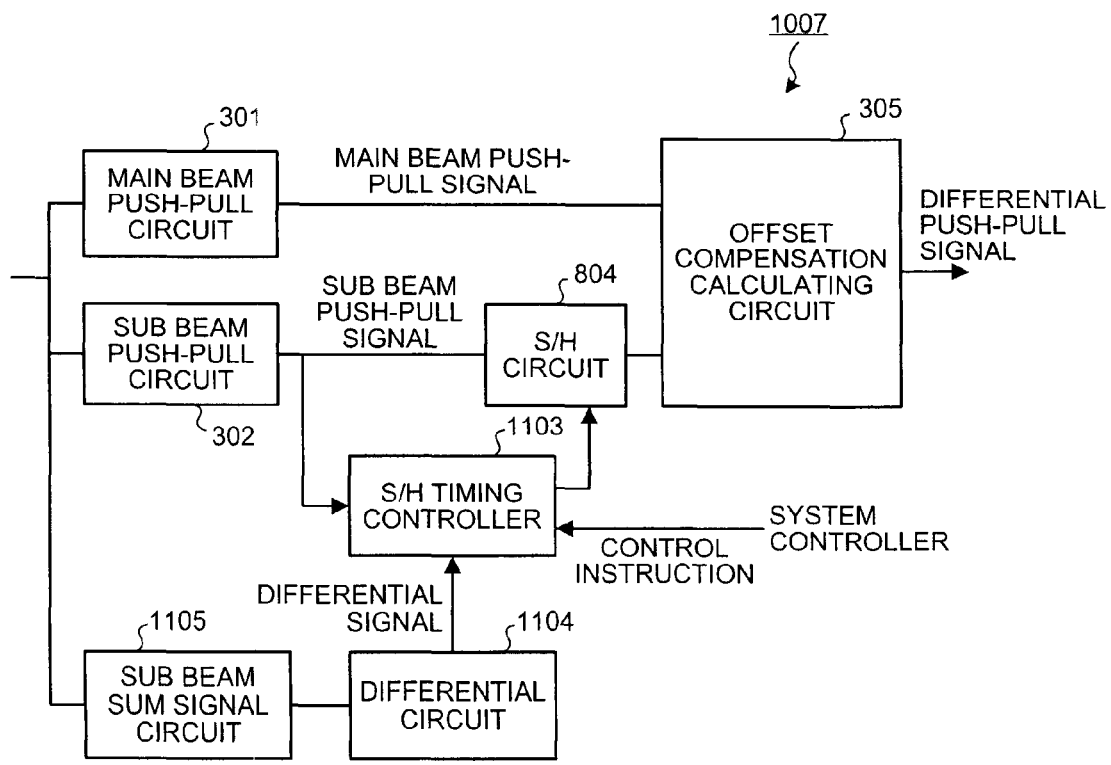
FIG. 11 is a block diagram of functional configurations of a tracking error detecting circuit according to the third embodiment.

As shown in FIG. 11, the tracking error detecting circuit 1009 includes: the main-beam push-pull circuit 301, the sub-beam push-pull circuit 302, a sub-beam sum signal circuit 1105, a differential circuit 1104, the S/H circuit 804, an S/H timing controller 1103, and the offset compensation calculating circuit 305. The main-beam push-pull circuit 301, the sub-beam push-pull circuit 302, the S/H circuit 804, and the offset compensation calculating circuit 305 are the same as those explained in the description of the first embodiment and the second embodiment.

The sub-beam push-pull circuit 302 outputs the sub-beam push-pull signal by performing a subtraction, between the divided cells, on the electric signals of the sub-beam reflected beams received by the photodetector 108. In contrast, the sub-beam sum signal circuit 1105 is a circuit that outputs a sub-beam sum signal by performing an addition, between the divided cells, on the electric signals of the sub-beam reflected beams received by the photodetector 108. The differential circuit 1104 is a circuit that outputs a differential signal by differentiating the sub-beam sum signal so as to calculate a change in the slope of the sub-beam sum signal.

The S/H timing controller 1103 judges that a time at which the differential signal of the sub-beam sum signal has a value that is larger than a third threshold value and a time at which the differential signal of the sub-beam sum signal has a value that is smaller than a fourth threshold value are boundary passing timing, the third threshold value and the fourth threshold value having been set on an upper side and a lower side.

Figure 12:
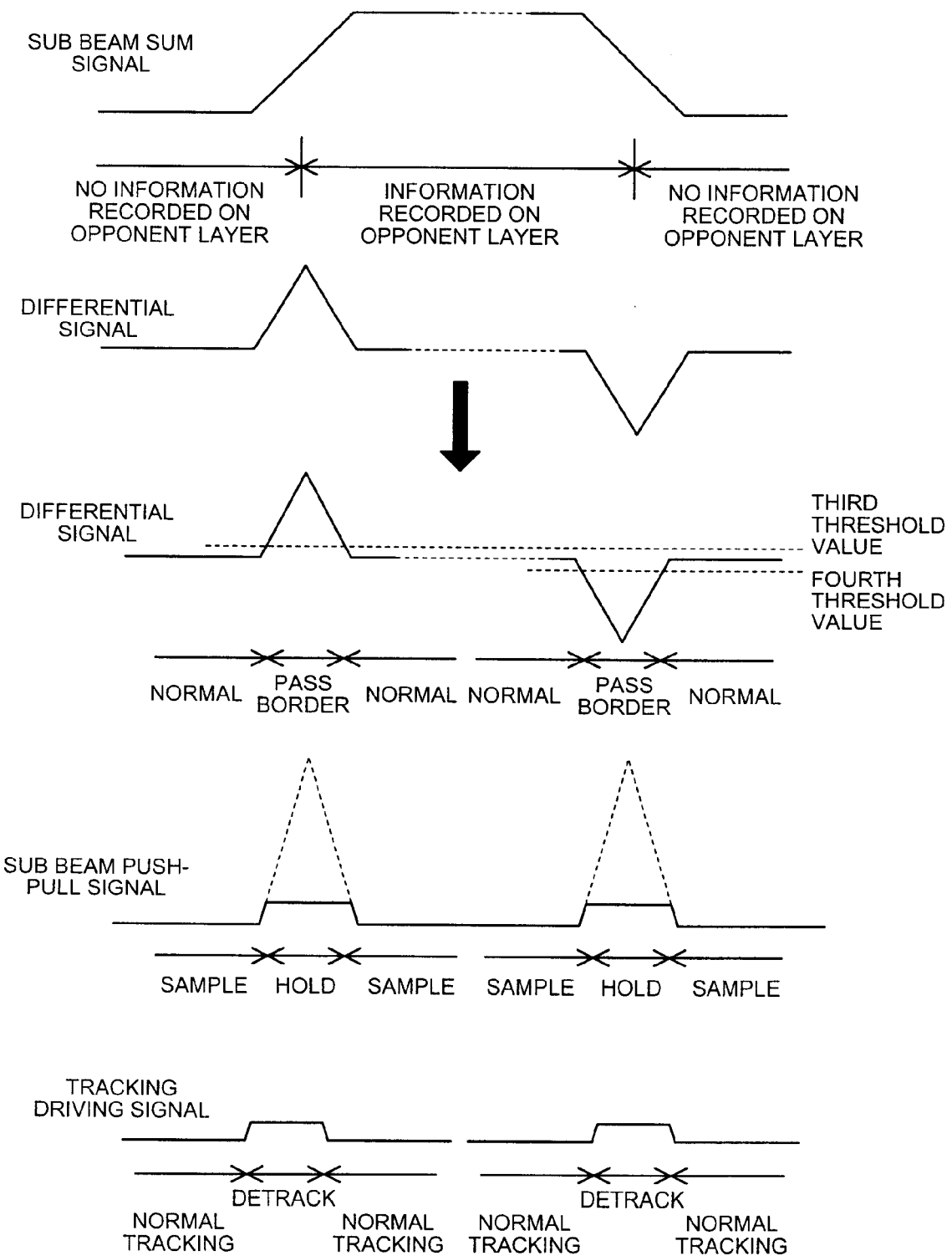
FIG. 12 is a drawing for explaining boundary passing timing according to the third embodiment.

In FIG. 12, the boundary passing timing according to the third embodiment is shown. In the following section an example will be explained in which a reflectance of the L1 layer 103 is low before information is recorded thereon and is high after information has been recorded thereon. As shown in FIG. 12, in a case where no information has been recorded in the area on a non-recording/reproducing information recording layer (i.e., an opponent layer), the sub-beam sum signal has a small value. After the beams pass through the recording boundary and enter an area where some information has already been recorded on the opponent layer, the sub-beam sum signal changes from the small value to a large value. On the other hand, when the beams pass through a boundary so as to move from an area where some information has already been recorded on the opponent layer to an area where no information has been recorded on the opponent layer, the sub-beam sum signal changes from a large value to a small value. Thus, the differential circuit 1104 differentiates the sub-beam sum signal and calculates the differential signal so as to detect a change in the slope of the sub-beam sum signal. As shown in FIG. 12, when the sub-beam sum signal changes from a small value to a large value, the differential signal is a pulse in the positive direction, whereas when the sub-beam sum signal changes from a large value to a small value, the differential signal is a pulse in the negative direction. Thus, as shown in FIG. 12, the S/H timing controller 1103 judges that a time period during which the differential signal has a value that is larger than the third threshold value and a time period during which the differential signal has a value that is smaller than the fourth threshold value are boundary passing timing, the third threshold value and the fourth threshold value having been set on an upper side and a lower side (i.e., the third threshold value used for detecting the differential signal being a pulse in the positive direction, and the fourth threshold value used for detecting the differential signal being a pulse in the negative direction). Accordingly, when the boundary passing is detected, the S/H circuit 804 is switched into the hold mode so that the sub-beam push-pull signal is maintained at a level that is observed immediately before the boundary passing.

As explained above, in the optical disk apparatus according to the third embodiment, the time period during which the differential signal obtained by differentiating the sub-beam sum signal has a value that is larger than the third threshold value and the time period during which the differential signal has a value that is smaller than the fourth threshold value are judged to be boundary passing timing, while the third threshold value and the fourth threshold value are set on an upper side and a lower side, so that the S/H circuit 804 is switched into the hold mode so as to maintain the sub-beam push-pull signal at a level that is observed immediately before the boundary passing. Thus, in addition to the advantageous effect according to the second embodiment, without taking into account small changes that are caused in the sub-beam push-pull signal by individual differences in disks and tracks, it is possible to accurately detect the boundary passing timing and to accurately perform the tracking servo process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for recording information to and reproducing information from an optical recording medium having a first information recording layer and a second information recording layer, comprising: a light source that emits a light beam; a diffractive optical element that divides the light beam into a first light beam and a second light beam; a converging unit that converges the first light beam and the second light beam on the optical recording medium; a driving unit that drives the converging unit; a light detecting unit that detects a first reflected light beam that is the first light beam reflected on the optical recording medium and a second reflected light beam that is the second light beam reflected on the optical recording medium; a tracking control unit that performs a tracking control by driving the driving unit based on a first tracking error signal obtained from the first reflected light beam and a second tracking error signal obtained from the second reflected light beam; and a correcting unit that corrects the first tracking error signal when the information is recorded to or reproduced from the first information recording layer that includes a first area and a second area, the first area being in opposite to an area on the second information recording layer on which no information is recorded, the second area being in opposite to an area on the second information recording layer on which information is recorded, wherein the tracking control unit performs the tracking control based on the first tracking error signal corrected by the correcting unit and the second tracking error signal, wherein the correcting unit includes a detecting unit that detects a boundary passing timing indicating a time at which the information is recorded to or reproduced from the first information recording layer that includes the first area and the second area, and a holding unit that holds the first tracking error signal when the detecting unit detects the boundary passing timing.

2. The apparatus according to claim 1, wherein the correcting unit includes a limiting unit that limits the first tracking error signal to a first threshold value.

3. The apparatus according to claim 2, wherein
the correcting unit further includes an adjusting unit that adjusts the first threshold value according to the first tracking error signal, and
the limiting unit limits the first tracking error signal to the first threshold value adjusted by the adjusting unit.

4. The apparatus according to claim 2, wherein the limiting unit is a limiter circuit that outputs the first tracking error signal by limiting the first tracking error signal to the first threshold value when the first tracking error signal exceeds the first threshold value.

5. The apparatus according to claim 1, wherein the detecting unit detects the boundary passing timing when the first tracking error signal exceeds a second threshold value.

6. The apparatus according to claim 1, wherein the detecting unit detects the boundary passing timing based on address information recorded on the optical recording medium.

7. The apparatus according to claim 1, wherein the detecting unit detects the boundary passing timing based on a change of a sum signal obtained from the first reflected light beam detected by the light detecting unit.

8. The apparatus according to claim 7, wherein
the detecting unit further includes a differential circuit that differentiates the sum signal and that outputs a differential signal, and
the detecting unit detects the boundary passing timing when the differential signal exceeds a third threshold value and a fourth threshold value.

9. The apparatus according to claim 1, wherein the holding unit includes a sample/hold circuit that operates in a sample mode in which an input of the first tracking error signal is output as it is and a hold mode in which an output of the first tracking error signal is held to a last value, and a circuit control unit that switches the sample/hold circuit to the hold mode when the detecting unit detects the boundary passing timing and switches the sample/hold circuit to the sample mode when the detecting unit detects no boundary passing timing.

10. A method of controlling a tracking an optical recording medium having a first information recording layer and a second information recording layer, comprising: dividing a light beam emitted from a light source into at least a first light beam and a second light beam; converging the first light beam and the second light beam on the optical recording medium; detecting a first reflected light beam that is the first light beam reflected on the optical recording medium and a second reflected light beam that is the second light beam reflected on the optical recording medium; performing a tracking control based on a first tracking error signal obtained from the first reflected light beam and a second tracking error signal obtained from the second reflected light beam; and correcting the first tracking error signal when the information is recorded to or reproduced from the first information recording layer that includes a first area and a second area, the first area being in opposite to an area on the second information recording layer on which no information is recorded, the second area being in opposite to an area on the second information recording layer on which information is recorded, wherein the performing includes performing the tracking control based on the first tracking error signal corrected at the correcting and the second tracking error signal, wherein the correcting includes detecting a boundary passing timing indicating a time at which the information is recorded to or reproduced from the first information recording layer that includes the first area and the second area, and holding the first tracking error signal when the detecting unit detects the boundary passing timing.

* * * * *